United States Patent [19]
Jewson et al.

[11] Patent Number: 5,621,905
[45] Date of Patent: Apr. 15, 1997

[54] TREE FORM MENU DISPLAY FOR A DATA PROCESSING SYSTEM

[75] Inventors: Michael A. Jewson, Eastleigh; Paul A. Beaven, Romsey, both of United Kingdom

[73] Assignee: International Business Machines Corporation, Armonk, N.Y.

[21] Appl. No.: 134,196

[22] Filed: Oct. 8, 1993

[30]     Foreign Application Priority Data

Oct. 12, 1992 [GB] United Kingdom ................... 9221405

[51] Int. Cl.⁶ ............................................ G06F 3/14
[52] U.S. Cl. .................... 395/353; 395/334; 395/340; 395/352
[58] Field of Search ............................. 395/155–166, 395/600

[56]              References Cited

U.S. PATENT DOCUMENTS

| | | | |
|---|---|---|---|
| 4,821,211 | 4/1989 | Torres | 395/156 |
| 5,065,338 | 11/1991 | Phillips et al. | 395/51 |
| 5,179,653 | 1/1993 | Fuller | 395/156 |
| 5,187,797 | 2/1993 | Nielsen et al. | 395/156 |
| 5,195,178 | 3/1993 | Krieger et al. | 395/156 |
| 5,295,261 | 3/1994 | Simonetti | 395/600 |
| 5,303,367 | 4/1994 | Leenstra, Sr. et al. | 395/600 |

OTHER PUBLICATIONS

JAPIO Abstract Sect. P, Section No. 560; vol. 11, No. 97, p. 110, dated Mar. 26, 1987, entitled "Menu Structure Display System", by Kazumasa Saito (PN JP 61-248128).

*Primary Examiner*—Mark R. Powell
*Assistant Examiner*—U. Chauhan
*Attorney, Agent, or Firm*—Norman L. Gundel

[57]                 ABSTRACT

A data processing system displays options for selection by a user as a hierarchical tree form diagram. When a user indicates his first selected option to the data processing system it calculates what further selections are and are not available as a result of the selected option. It then modifies the display to show the options which are available for selection and those which are not. A selection list is stored and updated by the data processing system and the options input by the user are executed when the selection list is complete.

8 Claims, 4 Drawing Sheets

TREE FORM MENU DISPLAY FOR A DATA PROCESSING SYSTEM

BACKGROUND OF THE INVENTION

1. Field of the Invention

The present invention relates to data processing systems and in particular to a graphical user interface for interacting with application or operating system software.

2. Description of the Related Art

In data processing systems a list of available machine or program functions or variables which may be selected by the operator is often shown on the display screen in the form of a menu. In some systems the title or a representation of each function or variable is displayed beside a corresponding letter or numeral. The desired function or task may be selected from the menu by typing the alphanumerical character on the command line. In other systems the desired function may be selected by positioning the cursor or mouse pointer under the title or other representation of the desired function. In some menu displays the first item in the menu is highlighted. The highlighting can be repositioned on another item in the menu by using the cursor movement keys. The desired choice of item is selected by pressing the "enter" key when that item is highlighted. Very often in menu user interfaces the choice of one item from the menu causes another menu to be displayed on the screen showing what further choices are available as result of the previous choice. As a result of making this further choice yet another menu may be displayed on the screen.

A known way of simplifying such a hierarchical menu system in which one menu choice leads to another menu of choices is to display the first menu as a menu bar at the top of the display screen. Each of the choices in the menu bar can be "pulled down" to display the next menu in the hierarchy, usually in the form of a display window.

These types of user interfaces are satisfactory when the number of choices is small. However as more complex options are presented to the user, the hierarchy of menus can quickly increase to the point where navigation through the menu system becomes difficult. For example, after an operator has descended to say the third level of a menu hierarchy, i.e. the third menu in the series to be displayed on the screen, he may have forgotten the alternatives he chose from at the top level, or have even lost track of where he is in the overall choice structure. In either case the operator has to "back up" the hierarchy to check on his position.

An alternative has been to use a "cascaded menu" as is supported in the IBM OS/2 Presentation Manager (trademarks of IBM Corp.) Release 1.2 operating system. A menu is displayed in a display window and when a choice is made from this menu the menu from the next level is displayed in a window adjacent to the window from which the first choice was made. This arrangement certainly helps navigation through a complex window hierarchy but only shows a limited subset of the structure in which the operator is navigating.

SUMMARY OF THE INVENTION

Viewed from one aspect the present invention provides a data processing system comprising: means for processing electric signals representative of options for selection by a user of the data processing system; means for presenting the options as a hierarchical tree form diagram on a display screen of the data processing system; means responsive to user input for signalling a first option selected to the processing means; programmed means for calculating which further selections are available and which further selections are not available as a result of the selected option, the further selections being dependent on the first option; means for modifying the display screen to display what further options are and are not available for selection; a memory for storing a selection list of each selection input by a user; programmed means for calculating whether or not the selection list is complete; means, responsive to the selection list calculating means, for indicating on the display screen whether or not the selection list is complete; and means for processing the options input by a user when the selection list is complete.

One advantage of the present invention is that it allows the operator or user to have an immediate impression of the choices available to him. The present invention is particularly useful in complex choice situations as it is easier to understand selection choices.

BRIEF DESCRIPTION OF THE DRAWINGS

In order that the invention may be fully understood preferred embodiments thereof will now be described, by way of example only, with the reference to the accompanying drawings in which.

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

Figure 1:
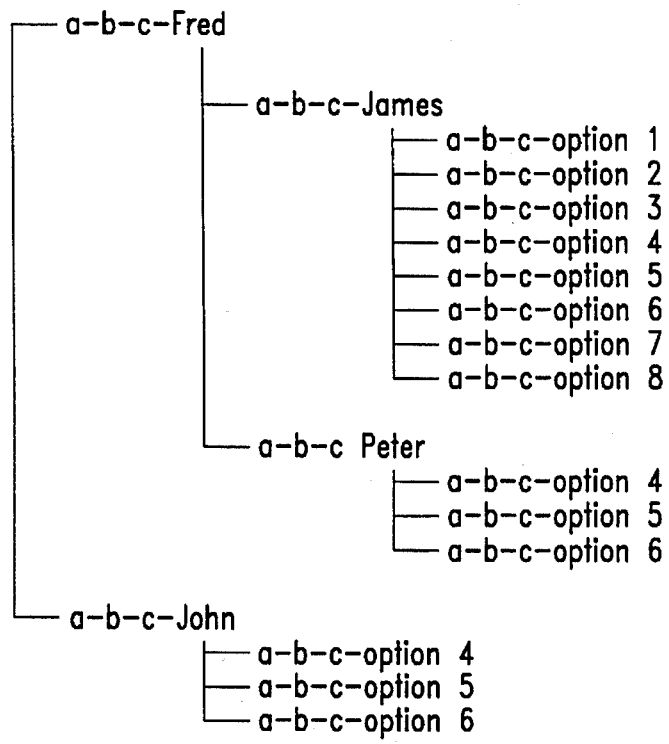
FIG. 1 shows an example of a menu tree displayed on the screen of a data processing system in accordance with the present invention.

In accordance with the present invention a menu is displayed on the display screen of a data processing system in the form of a tree structure. An example of such a tree structured menu is shown in FIG. 1. It can be seen from FIG. 1 that the initial choice available to the operator or user is between Fred and John. By choosing Fred, the operator is then given the further choice between James and Peter. If the operator chooses James then he is given a choice from options 1 to 8. Backing up to the first choice, if the operator was to choose John then he would be able to make a further choice from options 4 to 6. As can be seen from FIG. 1 all of the options listed above are displayed on the screen at the same time rather than each level of the menu being displayed separately.

The operator may indicate his choices by clicking a mouse or the cursor on the appropriate name. This may result in the highlighting or coloring of the chosen option.

Alternatively, and especially in the case where color is not available, an appropriate symbol may appear on the tree branch leading to the chosen option. By marking the options chosen by the operator in this way, the operator is able to see at a glance what choices he has made. As the operator proceeds with his selections he may well change his mind. This is conveniently accommodated by revisiting the point in the tree hierarchy where the previous decision was recorded and then changing the selection.

In a preferred embodiment of the present invention selected options from a menu tree are marked either by coloring, highlighting or by a special symbol appearing beside the chosen option or on the tree branch leading to that option. In the example shown in FIG. 1, each of the options are preceded by the letters "a," "b" and "c." One of these letters could be used in conjunction with coloring or highlighting to indicate whether or not that particular option is available as a result of an earlier choice of option. Another of these letters could be used to indicate which options had actually been chosen and the other letter could be used to indicate the most recent choice made by the operator. A further use of one of the letters or symbols is that of a check mark. This may be entered by the operator to remind him that further investigation may be required before he confirms this choice or that he does not want to commit himself to that particular choice and would like the option of changing his mind later. Alternatively the operator could select a check mark field which would then be highlighted, colored or indicated by a special character such as a "tick." It is not necessary for the letters or other symbols to be visible at all times, in accordance with another embodiment of the present invention the symbols only appear when indicated by the operator.

Figure 2:
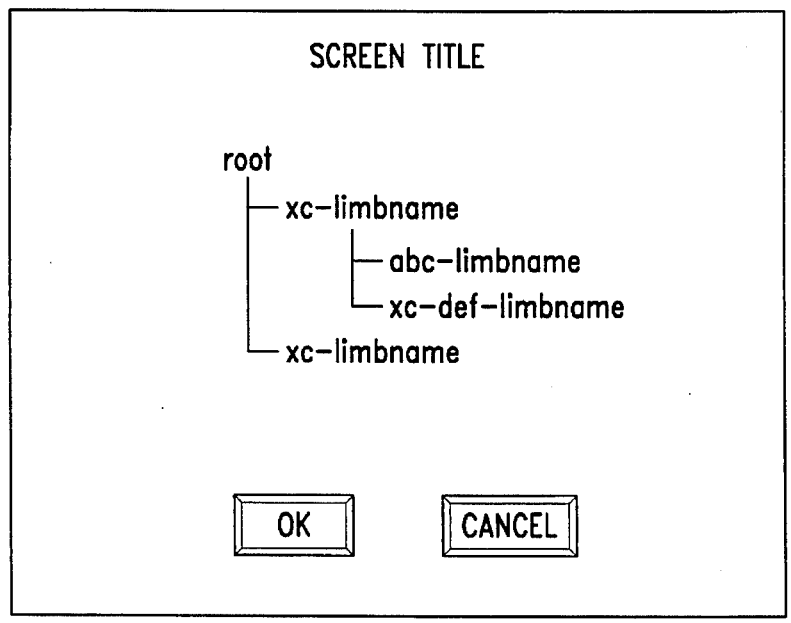
FIG. 2 shows the format of a typical screen display of a data processing system operating in accordance with the present invention.

FIG. 2 shows an example of a screen display of a data processing system or computer operating in accordance with the present invention. The operation of the data processing system will now be described with reference to FIG. 2 and the flow diagrams of FIGS. 3 to 7. Table 1 shows possible definitions of the variables displayed in FIG. 2.

TABLE 1

| | | |
|---|---|---|
| x | = | expand tree icon |
| c | = | contract tree icon |
| a | = | a selection choice |
| b | = | a selection choice |
| c | = | a selection choice |
| d | = | a selection choice |
| e | = | a selection choice |
| f | = | a selection choice |

Figure 3:
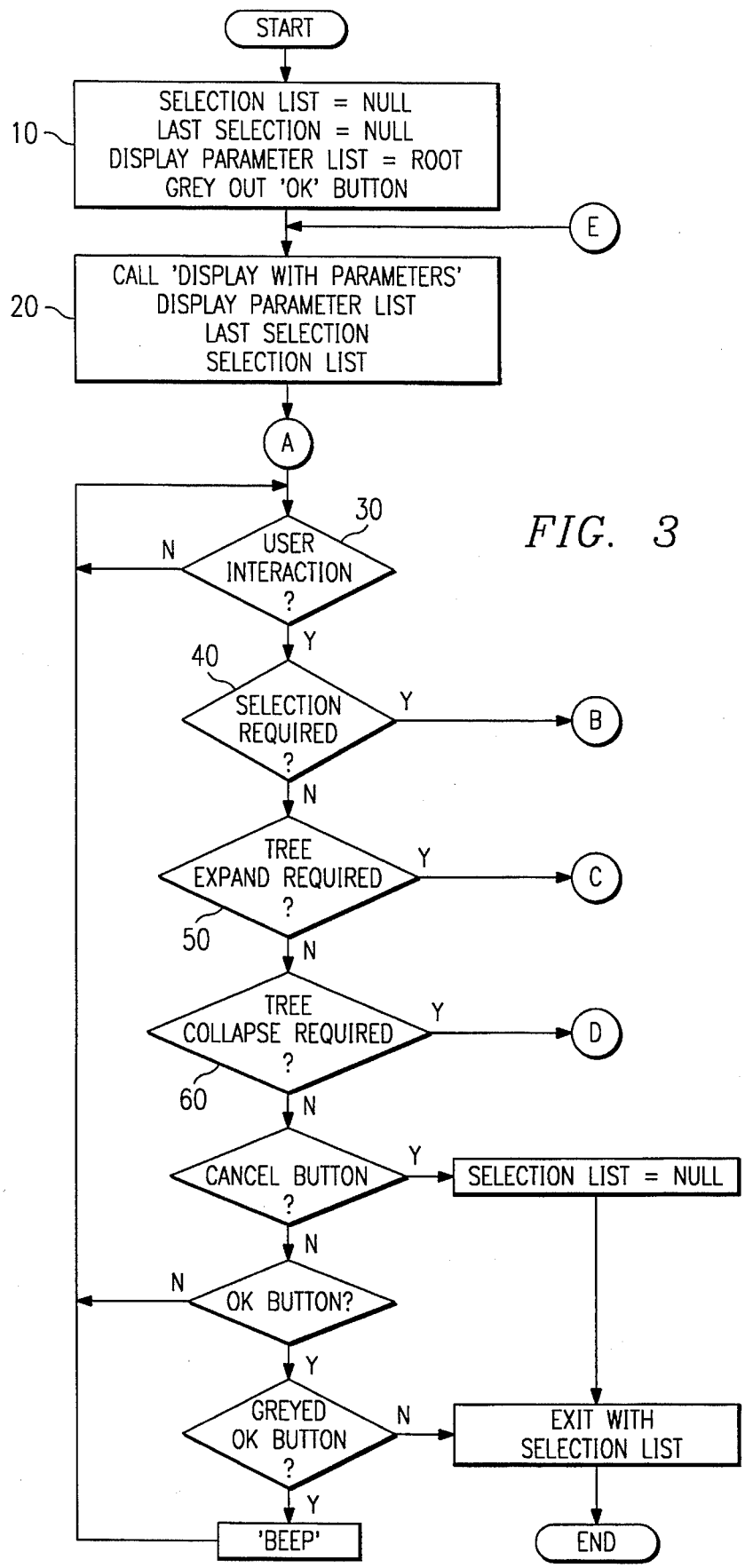
FIG. 3 shows a flow diagram which indicates the steps taken by a data processing system operating in accordance with the present invention.

The screen display shown in FIG. 2 is initialized at box 10 of FIG. 3. The "Selection List" holds a list of the selections which have been made and at initialization this list is empty. The "Last Selection" holds the last selection to have been made and is used for highlighting purposes. It is empty at initialization. The "Display Parameter List" holds information on how to display the tree. It lists those selection choices that are valid choices and highlights them using color and/or brightness. Invalid choices are grayed using a similar technique. The Display Parameter List also lists the limbs (or branches) of the tree structure that should be displayed. Initially it has a value "root," indicating that only first level limb names should be displayed. If any of the next level limb names are contained in this list, then that limb should be displayed and the names of the limbs below it are displayed. The "OK Button" is a selectable entity which appears in the same display window as the tree structure. When it appears in a test box (diamond shape) of the flow diagram it indicates a query asking whether the user made a selection of the OK Button or not. The OK Button is selected when the operator is satisfied that the appropriate selections from the tree have been made. The "Cancel Button" shown in FIG. 2 may be used at any time during the selection process if the operator decides to cancel the whole selection process. As in known data processing systems options not selectable at a particular time are grayed out. In the present case the OK Button is grayed out if the operator has not completed all the selections which are required.

At box 20 the tree display function is invoked. As can be seen in FIG. 2 the Display Parameter List, the Last Selection and the Selection List are displayed. At this stage a wait state or loop 30 is initiated. This loop terminates when the operator makes an interaction with the displayed tree.

Figure 4:
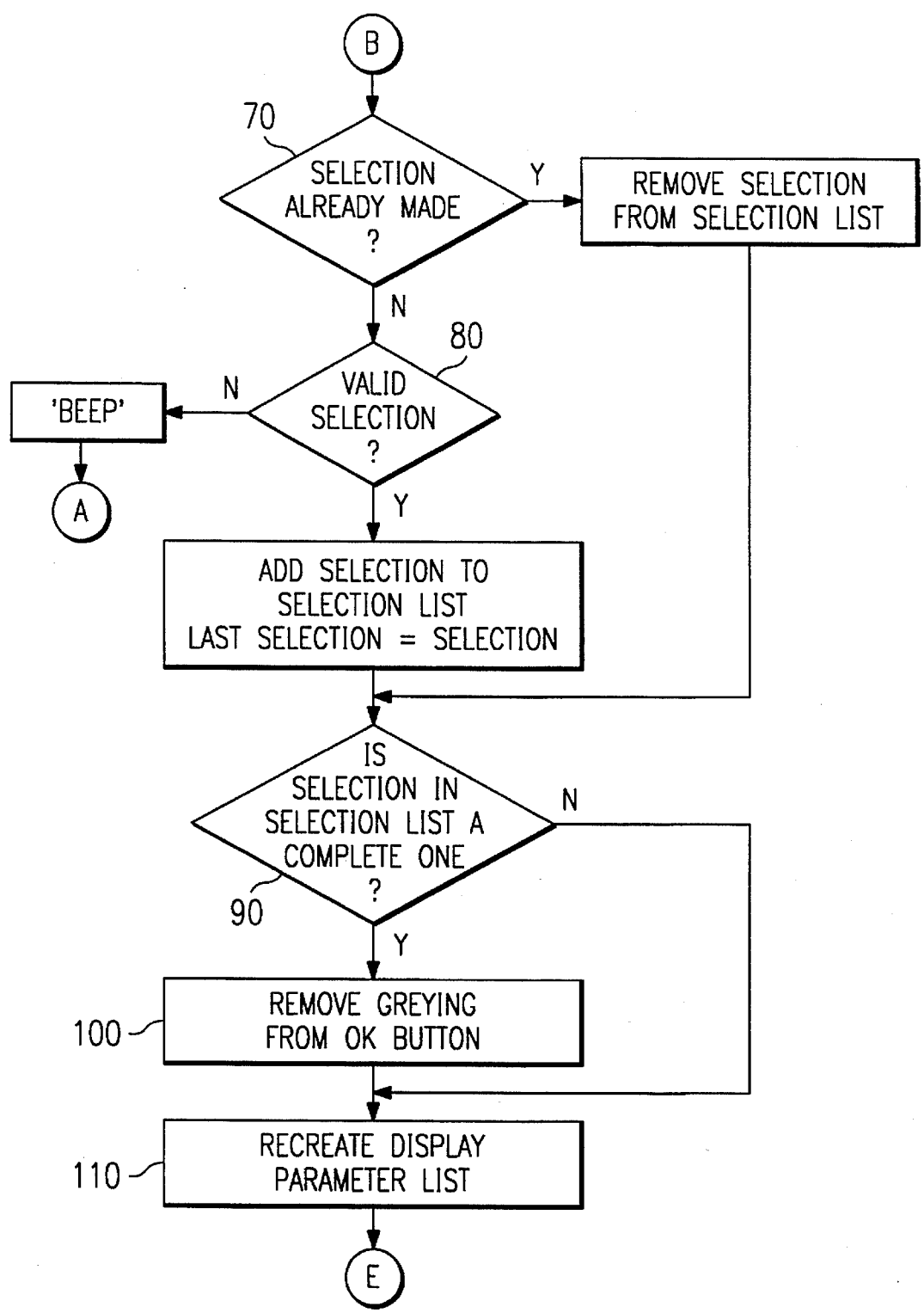
FIG. 4 shows the selection choice function.

Following an operator interaction, the tests 40, 50 and 60 are used to determine what action to take. The steps taken by the data processing system when the operator makes a selection (i.e. test 40 is satisfied) are shown in FIG. 4. A check is made at box 70 on whether the selected item has already been selected. If the selected item is being selected again, then the item is removed from the Selection List. Using this function the operator can change or back out of a selection decision. The flow diagram shown in FIG. 4 is invoked by a calling program (box 40 in FIG. 3). The calling program supplies the set of all valid selections. At box 80 if the set union of the selection just made and the Selection List is a subset of any of the valid selections then the selection just made is added to the Selection List. If this is not the case the computer signals the operator that an incorrect action has been attempted. In accordance with the preferred embodiment this is done by means of an audible sound accompanied by an error message indicating why the action was incorrect. At box 90 a check is made on whether the Selection List exists in the set of all complete and valid selections. If so then the graying is removed from the OK Button as is indicated at 100. After the graying has been removed or if the test made at 90 is negative, the operator is guided as to what choices are available for selection by the use of color and/or brightness of selectable objects shown on the display screen of the computer. The Display Parameter List contains some of this information. The rest is held in the Last Selection and the Selection List. The Display Parameter List guides the operator as to which selection choices are still available to him. (It should be noted that a completed selection could be a subset of another complete selection). At box 110 the updated Selection List is known and the list of selections which that Selection List is a subset of is extracted from the set of all valid selections. Removing all elements in the list of selections generated which already appear in the Selection List results in a list of all possible selections that can still be made. This is stored in the Display Parameter List and is used to control the highlighting or graying of objects in the tree structure.

Figure 5:
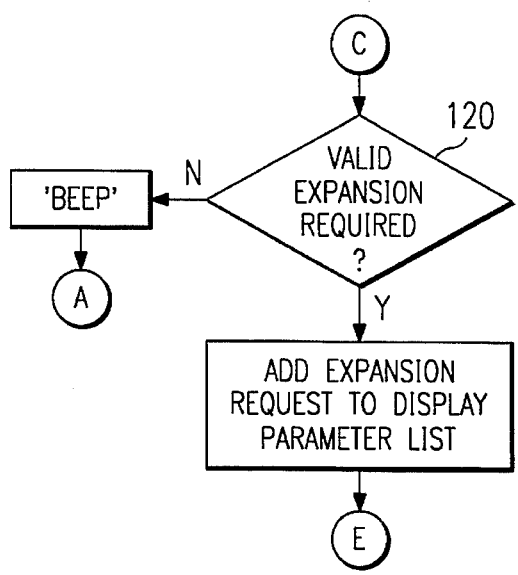
FIG. 5 shows the tree expand function.

Returning to FIG. 3 if the operator interaction was a request for expansion, this is detected at box 50. A representation of the total tree structure is held in the computer's memory and it is possible, due to size and complexity, that only part of the complete structure may be shown in a display window on the screen. In another embodiment of the present invention the whole screen is dedicated to displaying the tree structure. FIG. 5 shows steps taken by the computer when the operator wishes to expand the limb name of the tree to show the limb names below it in the hierarchy. A check is made at box 120 and if the limb is already expanded to its full extent, then it isn't valid to expand it again and the computer signals the operator that an incorrect action has been attempted. If the limb has not already been expanded, then the choices now revealed as a result of the expansion request are added to the Display Parameter List.

Figure 6:
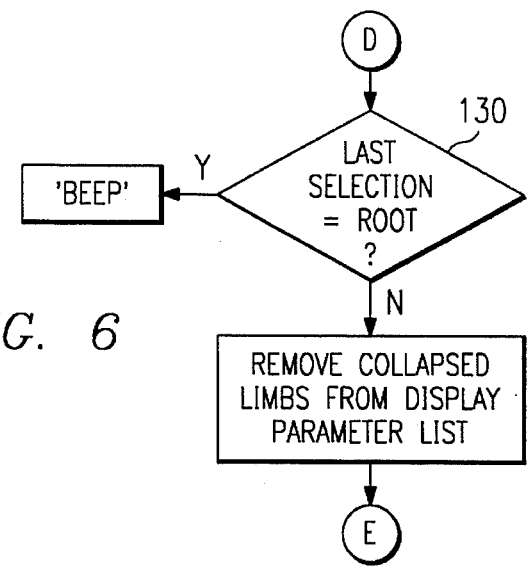
FIG. 6 shows the tree collapse function.

At box 60 of FIG. 3 an operator interaction requesting tree collapse is detected. This refers to collapsing all limbs below the selected limb in the hierarchy so only the selected limb's name remains. FIG. 6 shows the steps taken when the operator requests tree collapse. At box 130 the computer checks if the limb is already collapsed. It is not valid to collapse a limb which has already been collapsed and it is not valid to collapse the tree structure below the root limb shown in FIG. 2.

Figure 7:
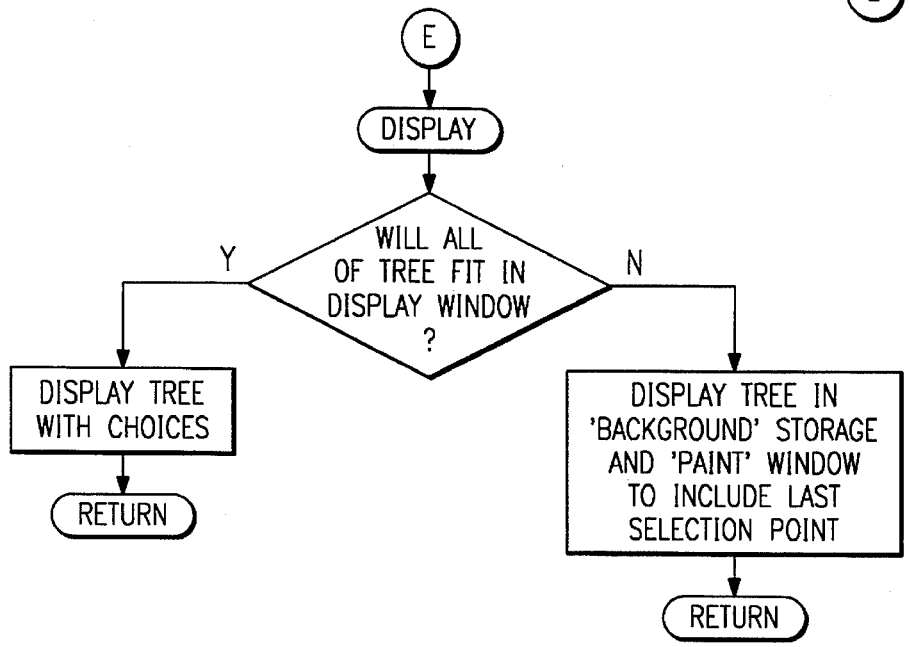
FIG. 7 shows the display function.

The flow diagram of FIG. 7 describes how the tree structure is displayed. In cases when the tree structure is so large that it does not fit in the display window or on the whole screen, the whole tree is drawn into storage in the data processing system (total tree structure) but only part of it is displayed (or painted). The part which is displayed includes the last selection made. If no selection has been made then at least the root is displayed. Vertical and horizontal scroll bars can be used by the operator to move the display window to different areas of the total tree structure not currently visible. The display function highlights those items on the display which have already been selected and also the last selection made by the operator. Items which are not selectable are grayed out. Highlighting and graying is achieved by the use of color and/or brightness.

Upon reference to the foregoing, it will be appreciated that the applicants have provided a novel and useful data processing system. While the invention has been particularly shown and described with reference to a preferred embodiment and process, it will be understood that various changes in form and detail may be made therein without departing from the spirit and scope of the invention.

We claim:

1. A data processing system comprising:

means for processing electric signals representative of options for selection by a user of the data processing system;

means for presenting the options as a hierarchical tree form diagram within a single window on a display screen of the data processing system;

means responsive to user input for signalling a first option selected to the processing means;

programmed means for calculating which further selections are available and which further selections are not available as a result of the selected option, the further selections being dependent on the first option;

means for modifying the display screen to display what further options are and are not available for selection;

a memory for storing a selection list of each selection input by a user;

programmed means for calculating whether or not the selection list is complete;

means, responsive to the selection list calculating means, for indicating on the display screen whether or not the selection list is complete; and means for processing the options input by a user when the selection list is complete.

2. A data processing system as claimed in claim 1 wherein selections may be made from the tree form diagram in any order.

3. A data processing system as claimed in any of claims 1 or 2, further comprising:

means for calculating what selections are mandatory as a result of a previous selection; and means for indicating the mandatory selections on the screen.

4. A data processing system as claimed in claim 3, further comprising means for indicating the most recent selection input by a user.

5. A method, performed in a data processing system, the method comprising the computer implemented steps of:

processing electric signals representative of options for selection by a user of the data processing system;

presenting the options as a hierarchical tree form diagram within a single window on a display screen of the data processing system;

in response to user input, signalling a first option selected to the processing means;

calculating which further selections are available and which further selections are not available as a result of the selected option, the further selections being dependent on the first option;

modifying the display screen to display what further options are and are not available for selection;

storing a selection list of each selection input by a user;

calculating whether or not the selection list is complete;

in response to the calculation of whether or not selection list is complete, indicating on the display screen whether or not the selection list is complete; and processing the options input by a user when the selection list is complete.

6. A method as claimed in claim 5 wherein selections may be made from the tree form diagram in any order.

7. A method as claimed in any of claims 5 or 6, further comprising:

means for calculating what selections are mandatory as a result of a previous selection; and means for indicating the mandatory selections on the screen.

8. A method as claimed in claim 7, further comprising means for indicating the most recent selection input by a user.

* * * * *